(12) United States Patent
Bullock

(10) Patent No.: US 12,446,543 B2
(45) Date of Patent: Oct. 21, 2025

(54) PORTABLE PET CRATE WITH TRANSPARENT WALL

(71) Applicant: Robert Wade Bullock, Williston, FL (US)

(72) Inventor: Robert Wade Bullock, Williston, FL (US)

(73) Assignee: Robert Wade Bullock, Williston, FL (US)

( * ) Notice: Subject to any disclaimer, the term of this patent is extended or adjusted under 35 U.S.C. 154(b) by 0 days.

(21) Appl. No.: 18/151,353

(22) Filed: Jan. 6, 2023

(65) Prior Publication Data

US 2024/0224929 A1  Jul. 11, 2024

(51) Int. Cl.
*A01K 1/02* (2006.01)

(52) U.S. Cl.
CPC .......... *A01K 1/0245* (2013.01); *A01K 1/0254* (2013.01)

(58) Field of Classification Search
CPC .. A01K 1/0245; A01K 1/0254; A01K 1/0236; A01K 1/0272; A01K 1/0281
USPC ......... 220/723, 720, 495.06, 495.08, 495.05, 220/495.01
See application file for complete search history.

(56) References Cited

U.S. PATENT DOCUMENTS

| | | | | |
|---|---|---|---|---|
| 6,560,779 | B1* | 5/2003 | Savage | A41D 6/00 2/1 |
| 11,344,396 | B2* | 5/2022 | Levine | A61D 3/00 |
| 2010/0043720 | A1* | 2/2010 | Yelverton | A01K 1/03 119/496 |
| 2014/0290660 | A1* | 10/2014 | Blair | A61G 10/02 |
| 2016/0081299 | A1* | 3/2016 | Wesley | A01K 1/03 |

FOREIGN PATENT DOCUMENTS

DE       10324354 A1    7/2004

* cited by examiner

*Primary Examiner* — Joshua J Michener
*Assistant Examiner* — Henry Hooper Mudd
(74) *Attorney, Agent, or Firm* — Kilpatrick Townsend & Stockton LLP

(57) ABSTRACT

Embodiments described herein relate to a pet crate safety system. The pet crate safety system can include a housing including a plurality of walls, the plurality of walls arranged to form a first volume, a first wall of the plurality of walls comprising a pet crate opening, and a second wall of the plurality of walls comprising a transparent portion, the second wall arranged at an opposite end of the pet crate as the first wall. The pet crate safety system can further include a mount arranged on a first surface of a wall of the plurality of walls. The pet crate safety system can further include a ventilated pet safety carrier configured to be removably mounted to the mount and arranged in the volume, the ventilated pet safety carrier further configured to form a second volume when attached to the mount.

7 Claims, 7 Drawing Sheets

PORTABLE PET CRATE WITH TRANSPARENT WALL

BACKGROUND

A pet crate is a small carriage, such as a box or cage, that a pet owner can use to transport a pet. A pet crate can be configured to provide a pet with a safe and comfortable journey along with an owner. A variety of animals can be transported using a pet crate, including a cat, a dog, a rodent, and a pig.

DETAILED DESCRIPTION

Figure 1:
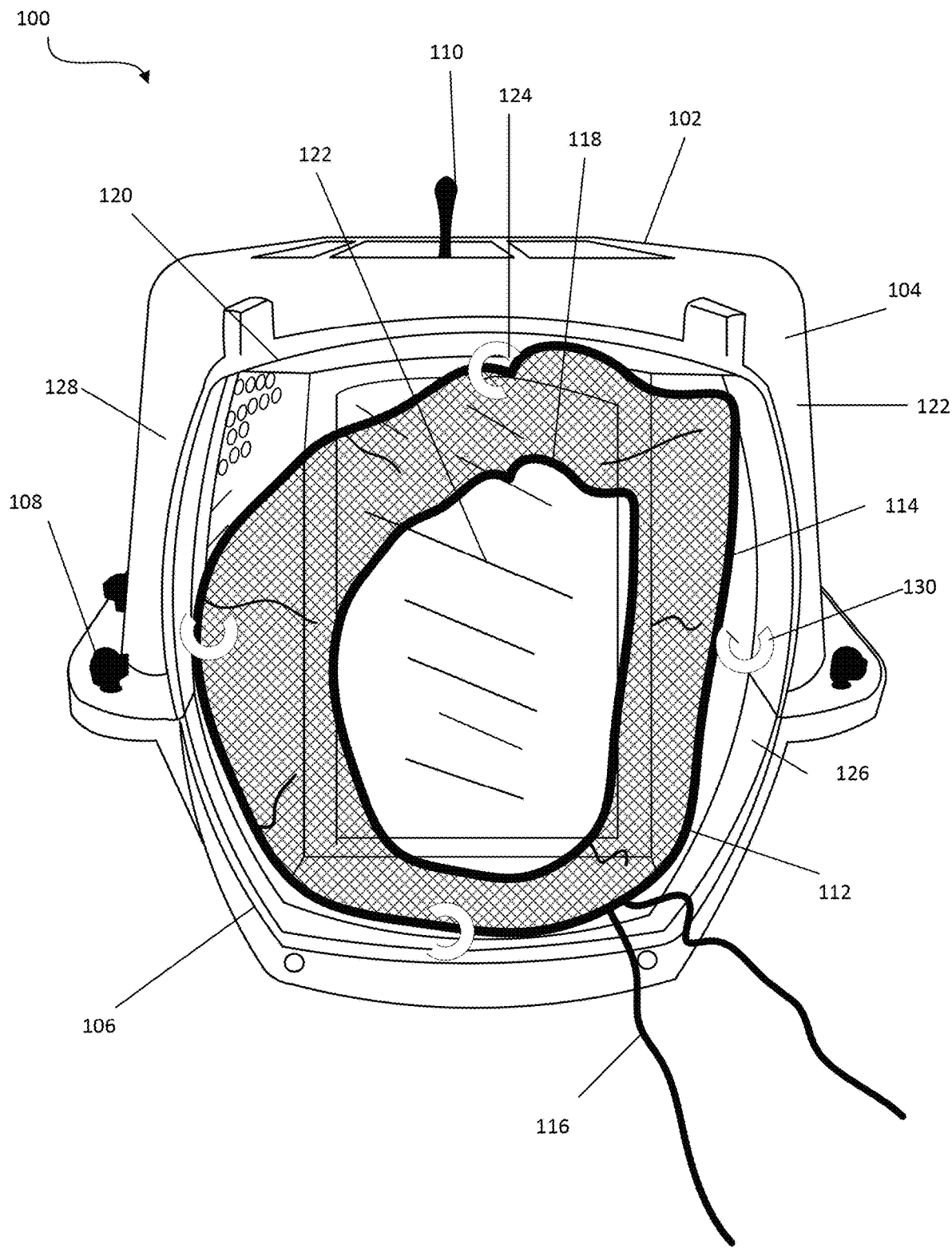
FIG. 1 is an illustration of a pet crate with a mounted mesh liner pet safety carrier, according to one or more embodiments.

The following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Veterinarians can see their patients in an examination room or an operating room. Typically, a pet owner or a staff member can bring a pet into the room using a pet crate. Once the pet is in the room, the veterinarian can remove the pet from the pet crate for examination or operation. In some instances, the pet can be startled from being removed from the safety of the pet crate and get loose in the examination room or operating room. The pet can further be resistant to being picked up and placed back on an examination table or operating table. For example, a cat can get loose, run around the room, and scratch or bite at the veterinarian or staff member that attempts to bring the cat back to the examination or operating table. This can lead to injuries for the pet, the veterinarian's staff, or the veterinarian.

The embodiments described herein address the above issues by providing a pet crate with a transparent wall. The pet crate can include a pet crate opening at one end and a transparent wall at an opposite end. While facing the pet crate from opening, the pet crate appears to have a tunnel structure that a pet can run through while evading a veterinarian or staff. However, the transparent wall closes off the tunnel such that a pet that enters the pet crate can be quickly secured in the pet crate. For example, the pet crate opening can include a gate that can be quickly closed and fastened to secure the pet in the pet crate. In addition, the pet crate can include a pet safety carrier that can be closed from the outside of the pet crate to secure the pet.

The pet safety carrier can be a structure that can form a living space for the pet with the pet crate. For example, the pet safety carrier can be a sack-like structure formed from a perforated material, such as a mesh liner. The pet safety carrier can, for example, removably attached to mounts arranged on an inner surface of the per crate housing. The pet safety carrier can include an opening to allow a pet to enter or leave the pet safety carrier. In some embodiments, the opening can be opened or closed, such as with a zipper, Velcro, clip, drawstring, or other appropriate feature. The drawstrings can extend outside the pet crate, and in the event that a pet runs inside the pet crate, the veterinarian can pull on the drawstrings to enclose the pet within the pet safety carrier.

Once the pet is in the pet safety carrier, the owner can then either open the gate or remove the top housing of the pet crate and take the pet, in the pet safety carrier, out for examination. It should be appreciated that although the herein embodiments are described with respect to using the portable pet crate with a transparent wall for securing a pet that has gotten loose in a veterinarian's office, other uses are contemplated. For example, the portable pet crate with the transparent wall can be used to secure the pet to other situations.

Once the pet crate is opened, the pet can remain in the pet safety carrier. The veterinarian's assistant or the veterinarian can remove the pet safety carrier with the pet inside from the pet crate and place the pet, inside the pet safety carrier, on an examination table. From there, the veterinarian's assistant or the veterinarian can examine the pet. In some instances, the pet safety carrier can include additional features such as a targeted opening, which can be opened or closed using a zipper, Velcro, clip, button, or other fastener. The targeted opening can be positioned to allow a veterinarian's assistant or the veterinarian to target one or more areas on the pet's body. One or more targeted openings can be arranged to allow a veterinarian's assistant or the veterinarian to pull out and expose, for example, an arm or leg through the targeted opening. For example, the veterinarian may need an unobstructed view of an arm or a leg and can expose the leg through the targeted opening while the rest of the pet remains in the pet safety carrier.

In addition to a targeted opening, the pet safety carrier can also include one or more safety restraints. For example, the pet safety carrier can include one or more straps that the veterinarian's assistant or the veterinarian can be used to restrain an uncooperative pet. As an example, a fractious cat can be extremely resistant to any form of interaction with a person. A situation, in which the cat is hissing, biting, scratching, and moving about can be dangerous for both the human and the cast. Keeping the cat inside the pet safety carrier can create a barrier between the cat's teeth and claws and the human. The safety restraints can provide an additional safety feature to prevent the cat from harming the human or from self-harm. The straps can include a fastening feature, such as a clip or Velcro to keep the straps in place. The safety restraint can be arranged on an outer surface of the pet safety carrier. The veterinarian's assistant or the veterinarian can wrap the safety restraint around the pet and then fasten the safety restraint with the fastening feature. In some instances, the veterinarian's assistant or the veterinarian can use the targeted opening and the safety restraint together. For example, the veterinarian's assistant can open a targeted opening and draw a pet's leg from the opening. The veterinarian's assistant can further wrap one or more safety restraints around the pet's other leg(s) and/or arms to keep the pet still. Once the veterinarian's assistant is finished examining the leg, the assistant can move the leg back into the pet safety carrier through the targeted opening and close the opening. The veterinarian's assistant can further loosen the safety restraints to allow the pet to move about the pet safety carrier.

If permissible, the pet can remain in the pet safety carrier throughout the veterinarian appointment. In this sense, the veterinarian can perform the examination, while protected from a pet scratching or biting the veterinary office staff. Furthermore, the pet can remain in a breathable pet safety carrier, while still maintaining visibility to the outside of the pet safety carrier. Once the examination is complete, the veterinarian can place the pet back into the pet owner's pet crate while in the pet safety carrier and either close the gate or reinstall the top housing. The pet owner can take their pet home in their own pet crate.

It can be seen from the description and figures that the embodiments herein describe techniques for safely securing a small animal without having to physically handle the animal. The pet crate can be arranged on the floor, for example, of an office, and an animal loose in the office can enter the pet crate without a user handling the animal. The animal can be secured in the pet safety carrier, and a user can close the ends of the of the pet safety carrier from outside the pet crate. For example, the pet safety carrier can include drawstrings that are extend outside the pet crate through openings in the pet create. Once the animal is inside the pet crate, a user can pull the drawstrings to close the ends of the pet safety carrier. In this sense, the user is not harmed from a feral or excited animal and the animal does not harm itself.

The herein description and figures relate to safely securing a cat. It should be appreciated that the herein described embodiments can be used to safely secure a variety of small animals, such as a racoon, squirrel, and rodents.

FIG. 1 is an illustration of a pet crate with transparent wall and a mounted pet safety carrier, according to one or more embodiments. A pet crate 100 can include a housing 102 that includes a first housing 104 and a second housing 106 that can be connected to the first housing 104. For example, the first housing 104 can be connected to the second housing 106 by one or more carrier fasteners 108, such as a bolt. In some embodiments, the first housing 104 can further include a flap on a top surface of the first housing. The flap can be opened without detaching the first housing 104 from the second housing 106. In these embodiments, a user can retrieve a pet by opening the flap, revealing an opening, and retrieving the pet from the opening in the first housing 104. In other embodiments, the housing 102 can include single housing, such that rather than have a first housing connected to a second housing, the housing 102 can be fabricated as a single structure. The pet crate 100 can further include a handle 110 connected to the housing 102 for permitting a user to carry the pet crate 100.

A pet safety carrier 112 can be arranged inward from a surface of the pet crate 100. For example, the pet safety carrier 112 can be arranged in a living space formed by the pet crate 100. The pet safety carrier 112 can be a ventilated pet safety carrier (e.g., a mesh liner pet safety carrier) for allowing air to pass through the pet safety carrier 112. The pet safety carrier 112 can be in an expanded state or a collapsed state. The expanded state can include a stretched state or an unstretched state. In the expanded state, the pet safety carrier 112 can be configured to have a volume that creates a living space for the pet. This can allow a pet to see out of the pet safety carrier 112 and to breathe while in the pet safety carrier 112. The pet safety carrier 112 can further be fabricated from a material (e.g., polyester or nylon) that provides comfort to the pet while in the pet safety carrier 112. The pet safety carrier 112 can include a first pet safety carrier opening 114 for allowing a pet to enter and leave the pet safety carrier 112. The pet safety carrier 112 can include one or more mechanisms to open or close the first pet safety carrier opening 114. As illustrated, the first pet safety carrier opening 114 includes a drawstring 116, which can be used to open or close the first pet safety carrier opening 114. For example, once a pet enters the pet safety carrier 112, a user can pull the drawstring 116 to reduce the size of the first pet safety carrier opening 114. This can prevent a pet inside the pet safety carrier 112 from getting out of the pet safety carrier 112. The user can also pull at the opening to increase the size of the first pet safety carrier opening 114. This can allow a pet to enter the pet safety carrier 112 or leave the pet safety carrier 112. It should be appreciated that in other embodiments, the first pet safety carrier opening 114 can be opened or closed using other mechanisms, such as a zipper, Velcro, clip, button, or other fastening mechanisms.

The pet safety carrier 112 can further include a second pet safety carrier opening 118 at an opposite end of the first pet safety carrier opening 114. As illustrated, when mounted to an inner surface of the housing 102, the pet safety carrier can have a tunnel arrangement where the first pet safety carrier opening is proximate to pet crate opening 120 and the second pet safety carrier opening 118 can be proximate to a transparent portion 122. The transparent portion 122 can be a wall of the pet crate 100 or a portion of the wall of the pet crate 100. As illustrated, the tunnel formed by the pet safety carrier 112 exposes the transparent portion 122. As illustrated, the transparent portion 122 is arranged at a center of the wall of the pet crate 100 with a balance of the wall forming a frame around the transparent portion 122. A pet facing the pet crate opening 120 can see through the tunnel and through the transparent portion 122, creating the impression in the pet's mind that the pet can run into the pet crate 100 at the pet crate opening 120 and out of an opposite end. Once the pet runs into the pet safety carrier 112, a user can pull the drawstring 116 of the first pet safety carrier opening 114 and a drawstring of the second pet safety carrier opening 118 and secure the pet in the pet safety carrier 112.

The pet crate 100 can further include an array of mounts, including a first mount 124 for securing the pet safety carrier 112 to the pet crate 100. The first mount 124 can be connected to the pet crate 100 and arranged inward from a surface of the pet crate 100. The first mount 124 can assume various forms, such as a hook, Velcro, clip, button, strap, or other mount operable to mount the pet safety carrier 112 to a surface of the pet crate 100. For example, the first mount 124 can include a Velcro strap attached to the pet crate 100 and the pet safety carrier 112 can include an opposing Velcro strap that can be removably attached to the Velcro strap attached to the pet crate. As illustrated, the first mount 124 can include a hook that can receive a portion of the pet safety carrier 112. For example, the circumference of the first pet safety carrier opening 114, including the drawstring, can be received by the first mount 124, such that the mount holds the pet safety carrier 112 proximate to the pet crate 100. In some embodiments, the pet crate 100 can include multiple mounts that hold the first pet safety carrier opening 114 and multiple mounts to hold the second pet safety carrier opening 118.

The pet crate 100 can include multiple walls (e.g., side walls, bottom walls, top walls). For example, a box shaped pet crate 100 can include six walls. One wall of the pet crate can include a pet crate opening 120. In some embodiments, the pet crate opening 120 can be connected to a gate (e.g., a slidable gate or a rotatable gate) that can prevent a pet from entering or leaving the pet crate 100. The pet crate 100 can include an array of mounts arranged on a surface of the pet crate 100 can be proximate to the pet crate opening 120. The multiple mounts arranged proximate to the pet crate opening 120 can each receive a portion of the pet safety carrier 112, such that the first pet safety carrier opening 114 can be wide enough to allow a pet to enter or leave the pet safety carrier 112. Each wall can further include an outer surface 126 and an inner surface 128. The pet crate 100 can further include additional mounts that can be arranged on the pet crate 100 and inward from a surface of the pet crate (e.g., connected to an inner surface of a wall). For example, a second mount 130 can be arranged on an inner surface 128. These mounts can be configured to receive a body of the pet safety carrier 112, such that the pet safety carrier 112 is expanded to form a volume that creates a living space for the pet to enter and rest inside the pet safety carrier 112. As illustrated, the pet safety carrier 112 is not connected to the second mount. However, the pet safety carrier 112 can still remain in an expanded state without being connected to each mount. Therefore, even if the pet safety carrier 112 is not attached to each mount of the array of mounts, the pet safety carrier 112 can be arranged in a tunnel configuration that allows the pet to see through the pet safety carrier and the transparent portion 122.

Figure 2:
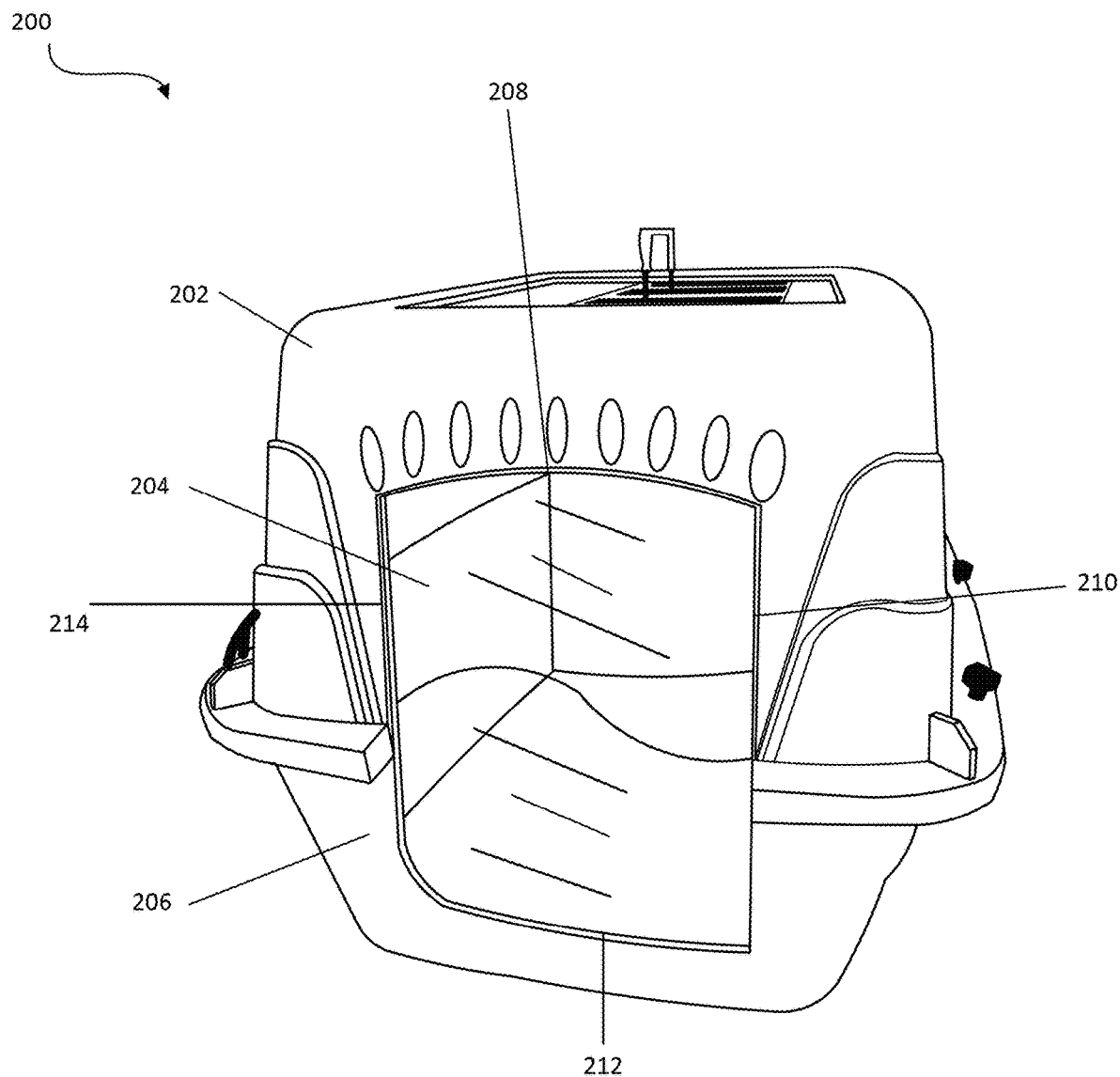
FIG. 2 is an illustration of a pet crate with a transparent wall, according to one or more embodiments.

FIG. 2 is an illustration 200 of a pet crate with a transparent wall, according to one or more embodiments. As illustrated, the pet crate 202 includes a transparent portion 204. The transparent portion 204 can include a transparent material (e.g., glass, transparent polymer) that permits light to transmit through the material pet safety carrier (e.g., the pet safety carrier 112 of FIG. 1) can be arranged in the pet crate 202. The glass can be a shatter proof glass to prevent a pet from getting injured in case the glass breaks. As illustrated, the transparent portion 204 can have a rectangular contour and form a window on a wall 206 of the pet crate 202, in which the wall can form a frame around the transparent portion 204. The transparent portion 204 can be flat and have a thickness that is generally similar to the thickness of the wall 206. In other instances, the transparent portion can have other geometric contours, such as a square or curved contour. In instances that the pet crate 202 includes a first housing and a second housing, the transparent portion 204 can be connected to the first housing and the second housing. For example, the first housing and the second housing can include grooves into which the transparent portion 204 can be slidably inserted. In other instances, the transparent portion can be connected to the pet crate 202 using an adhesive or a fastener. The transparent portion 204 can be securely connected to the wall 206 to prevent a pet from running into the pet crate, hitting the transparent portion, and dislodging the transparent portion 204 from the wall 206.

The transparent portion 204 can be arranged on the pet crate 202 on a wall 206 that is opposite to a pet crate opening (e.g., the pet crate opening 120 of FIG. 1). Having the transparent portion 204 on the opposite end creates an impression of a tunnel to a pet facing either pet crate opening. The wall 206 can have a first edge 208, a second edge 210, a third edge 212, and a fourth edge 214 that are each arranged inwardly on the wall 206. Without the transparent portion 204, the first edge 208, the second edge 210, the third edge 212, and the fourth edge 214 can define an opening at the wall. It should be appreciated that in the instance that the transparent portion has a curved contour, the opening in the wall can be defined by a single edge. The transparent portion 204 can be connected to the wall 206 at the first edge 208, the second edge 210, the third edge 212, and the fourth edge 214. For example, as indicated above, each edge can include a groove into which the transparent portion can be inserted. In other instances, the transparent portion 204 can be connected to the edges using a fastener or adhesive.

Figure 3:
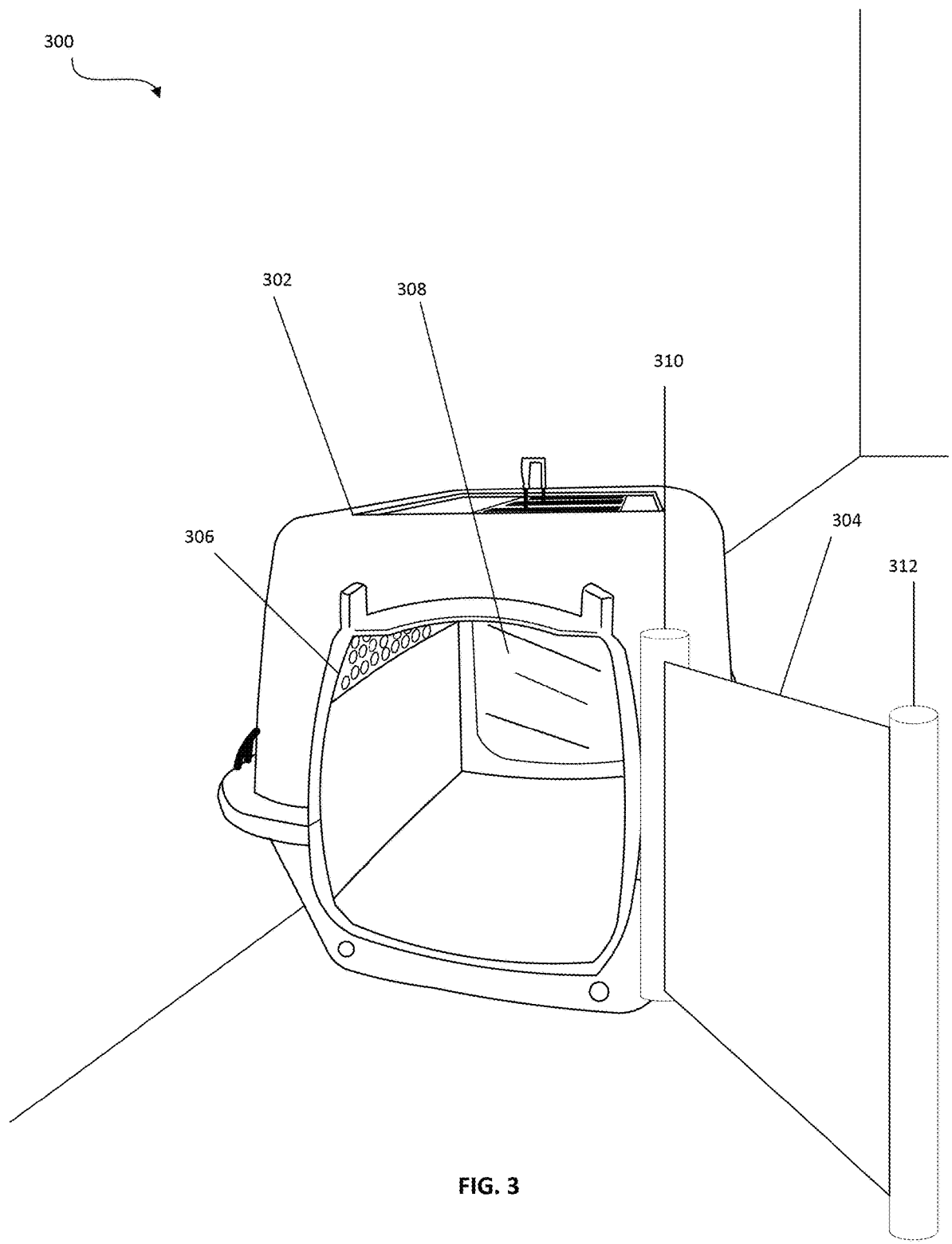
FIG. 3 is an illustration of a pet crate with a guiding flap, according to one or more embodiments.

FIG. 3 is an illustration 300 of a pet crate with a guiding flap, according to one or more embodiments. A pet crate 302 can include a first guiding flap 304 and in some embodiments a second guiding flap. The first guiding flap 304 can be arranged proximate to a pet crate opening 306, which can be the same pet crate opening 120 of FIG. 1. The first guiding flap 304 is illustrated in an extended state extending away from the pet crate 302. In some embodiments, the first guiding flap 304 can be rigid flap. In other embodiments, the first guiding flap can be a non-rigid flap. A rigid flap can be fabricated from a same or different material as a housing of the pet crate. For example, the rigid flap can be fabricated from an opaque material (e.g., plastic, metal) forming a sheet. The rigid flap can be an extended state or a recessed state. For example, the rigid flap can be rotatable about a guide mount 310 attached to the pet crate. The rigid flap can be arranged to be flush with a side wall of the pet crate 302 in a recessed state and rotate away from the pet crate 302 to an extended state. In other instances, the rigid flap can slide into guide mount 310. For example, the guide mount 310 can include an orifice that permits the rigid flap to slide through the guide mount 310. The rigid flap can be slid into the orifice to reach a recessed state, where the flap is flush against a slide wall of the pet crate 302. The rigid flap can be slid away from the pet crate 302 through the orifice to reach an extended state.

In some embodiments, the first guiding flap 304 can be a non-rigid flap. For example, the non-rigid flap can be fabricated from a textile (e.g., canvas, polyester, hemp, nylon) and be retractable into the guide mount 310. The non-rigid flap can be in a recessed state, in which the flap remains coiled inside the guide mount 310. The non-rigid flap can be in an extended state in which the flap extends away from the pet crate 302. In some instances, a user can pull the non-rigid flap away from the guide mount 310. The guide mount 310 can include a retracting mechanism, such that a user can pull the flap a first time away from the guide mount 310 and flap initially does not retract. The stand 312 can prevent the non-rigid flap in the extended state from collapsing onto the ground. The user can pull the flap a second time causing the retracting mechanism to retract the flap into the guide mount 310.

It should be appreciated that the above are two examples of a first guiding flap 304, and it can be contemplated that the first guiding flap can have forms that guide a small animal into the pet crate 302.

As illustrated, the first guiding flap 304 can be arranged on an opposite end of the pet crate 302 as a transparent portion 308. It can be seen that a pet looking into the pet crate 302 from the pet crate opening 306 and toward the transparent portion 308 can see through the transparent portion 308, creating the illusion of a tunnel. The first guiding flap 304 can guide the pet into the pet crate 302 to be secured. For example, the pet crate 302 can be arranged adjacent to a wall of an office, such as a veterinarian's office. The office wall in combination with the first guiding flap 304 can be a guide for the cat to go into the pet crate 302.

The first guiding flap 304 (rigid or non-rigid) can be in an extended state and a cat can be running around a veterinarian's examination room. The cat's attention can be guided by the first guiding flap 304 to the pet crate opening 306. The cat can see through the transparent portion 308 and assume that it can run through the pet crate 302 from the pet crate opening 306 and through an open back side of the pet crate 302. However, once inside the pet crate, the cat's movements are restricted by the transparent portion 308.

In some embodiments, the pet crate 302 further includes a pet safety carrier arranged in the compartment of the pet crate 302. In the expanded state, the pet safety carrier can form a tunnel, in which one end of the tunnel is proximate to the pet crate opening 306 and another end is proximate to the transparent portion 308. The pet can look into one end of the tunnel formed by the pet safety carrier near the pet crate opening 306 and see out of the other end of the tunnel near the transparent portion 308. As the pet can see through the transparent portion 308, the pet can believe pet crate 302 forms an open tunnel that can be traversed from one end and out another end. (See, for example, FIG. 1).

Figure 4:
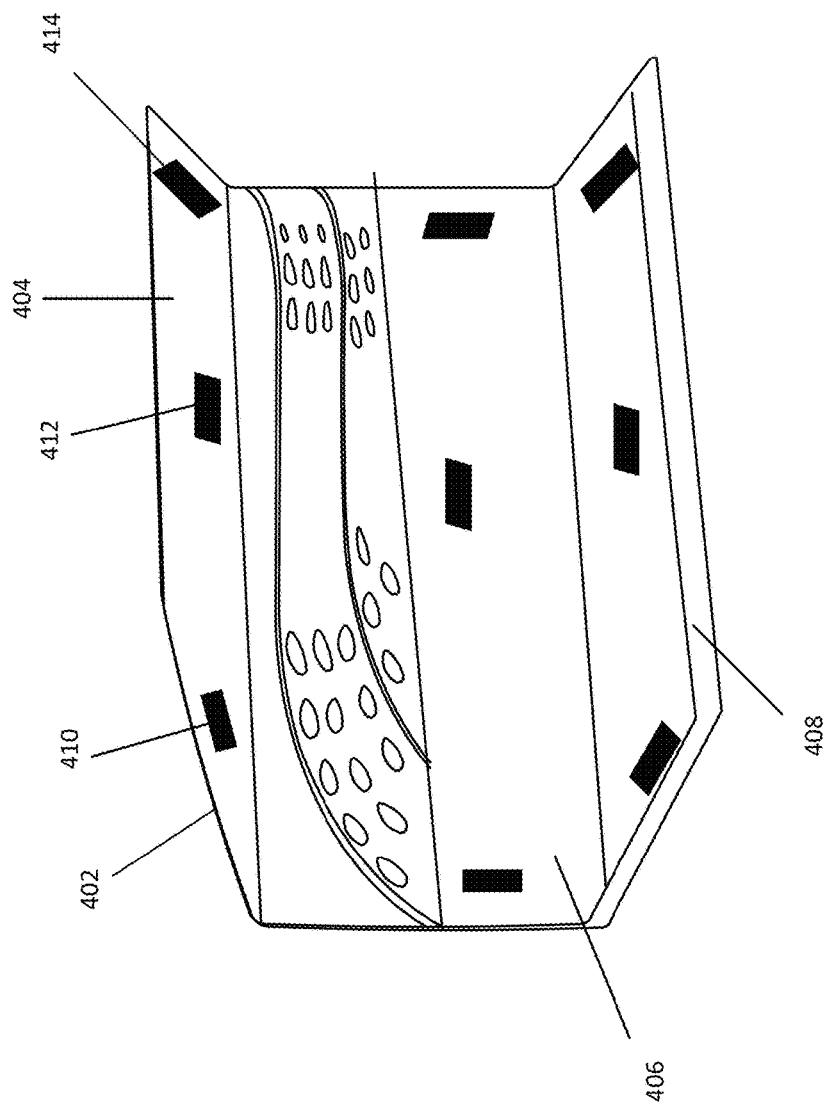
FIG. 4 is an illustration of a pet crate, according to one or more embodiments.

FIG. 4 is an illustration 400 of a pet crate 402, according to one or more embodiments. For illustration purposes, the pet crate 402 includes a top wall 404, a side wall 406, and a bottom wall 408. An opposing side wall, an entrance wall, and an opposing wall to the entrance wall (e.g., a wall with a transparent portion) have been left out to view the interior of the pet crate. The entrance wall can include a pet crate opening that can be secured, for example, by guided flaps or a rotatable gate. The pet crate 402 can form a volume that can be a living space, in which the pet can remain while being transported. As indicated above, the pet crate 402 can include one or more mounts connected to the inner surface of the carrier. In some embodiments, a pet safety carrier can include one or more mounting features that can be used to removably attach the pet safety carrier to the pet crate 402.

The mounts can be connected to one or more walls of the pet crate 402. In some embodiments, the mounts can be arranged proximate to an entrance wall and an opposing wall to the entrance wall. For an example of mounts arranged proximate to the gated wall see, also, FIG. 1. The mounts, when connected to the pet safety carrier, can cause the pet safety carrier to be in an expanded state. For example, a pet crate 402 can include a mount on the top wall 404, side wall 406, and the opposing side wall. As illustrated, a first mount 410 is connected to an inner surface of the top wall 404 and proximate to an entrance wall. As further illustrated, a second mount 412 can also be arranged on the top wall 404. In some instances, the first mount 410 can be removably connected on or about an opening of the pet safety carrier. The second mount 412 can be removably connected to a body of the pet safety carrier. In this sense, the first mount 410 can assist in keeping the one end of the pet safety carrier wide enough to allow the pet to enter the pet safety carrier. The second mount 412 can assist in keeping the body in an expanded state to provide a living space for the pet. The pet crate 402 can further include a third mount 414 proximate to a wall having a transparent portion. The third mount 414 can assist in keeping an opposite end of the pet safety carrier wide enough to allow the pet to see through a tunnel formed by the pet safety carrier and through the transparent portion. Each mount can take the form of Velcro, a clip, a button, or other form of mount. If a pet safety carrier were to be connected to a mount, the mount can prevent the pet safety carrier from collapsing onto the bottom wall 408 due to gravity.

The pet crate 402 can include an array of mounts that form a system to both form a tunnel and a volume for the pet to comfortably stay in while being transported. As seen, the pet crate 402 can include three mounts proximate to the entrance wall. The pet crate 402 can further include a fourth mount on an inner surface of the side wall 406. The fourth mount, when removably connected to the pet safety carrier can keep the opening of the pet safety carrier wide enough to allow a pet to enter. The pet crate 402 can further include a fifth mount on the bottom wall 408 for securing the pet safety carrier to the pet crate 402. Each of the mounts can be used to keep the pet safety carrier in an expanded state to form the tunnel for securing the pet.

It should be appreciated that although FIG. 4 illustrates a first mount 410, a second mount 412, a third mount 414, a fourth mount, and a fifth mount, various other configurations for mounting a pet safety carrier can be envisioned. It should be appreciated that the pet crate 402 can include any number of mounts on the inner surface. For example, the inner surface of the top wall 404 can include a single piece of Velcro that extends across the inner surface of the top wall 404 from the entrance wall to the opposite wall with the transparent portion. In other embodiments, the inner surface of the top wall 404 can include zero mounts. This would be the instance that the side wall 406 and the opposing side wall included mounts close enough to top wall 404 that, when connected to the pet safety carrier, prevent the carrier from collapsing onto the bottom wall.

In addition to one or more mounts on the top wall 404, the pet crate 402 can include mounts on the side wall 406. Although not illustrated, the opposing side wall can also include mounts. For illustration purposes, the side wall 406 can include a sixth mount, and an opposing side wall can also include a mount arranged similarly to the sixth mount. The mounts can be arranged on the side wall 406 and the opposing side wall in a variety of arrangements. For example, in some embodiments, in which the side wall 406 is a combination of a top housing and bottom housing, the pet crate 402 can include a mount on a top housing and a mount on a second housing. In other embodiments, in which the pet crate 402 includes a single housing, the pet crate 402 includes at least one mount on the side wall 406. The side wall 406 and the opposing side wall can include a respective mount that, when connected to the pet safety carrier, can hold the pet safety carrier in an expanded state. Each of the mounts on the side wall 406 and the opposing side wall can prevent the pet safety carrier from collapsing inward or onto the bottom wall 408. For example, the side wall 406 can include three mounts arranged similarly to the top wall 404 (e.g., a mount proximate to the gated wall, a mount centrally located on the side wall 406, and an opposing wall to the gated wall).

In some embodiments, the pet crate 402 can include mounts for connecting to the bottom wall 408 of the pet safety carrier. These mounts can secure the pet safety carrier to the bottom wall 408 to prevent the pet safety carrier from moving about while being transported.

The pet safety carrier can include corresponding mounts for the pet crate mounts. For example, if the first mount 410 is Velcro, the pet safety carrier can include a corresponding piece of Velcro for connecting to the Velcro mount on the first mount 410. In this sense, the pet crate 402 and the pet safety carrier can be a system that creates both a tunnel and a safe living space for the pet through expansion of the pet safety carrier using the mounts. For example, once the pet enters the tunnel formed by the pet safety carrier, the veterinarian can pull both drawstrings to secure the pet in the pet safety carrier. Even though the pet is secured by exiting the pet safety carrier, the mounts can keep the pet safety carrier in an expanded state to provide a comfortable living space.

Figure 5:
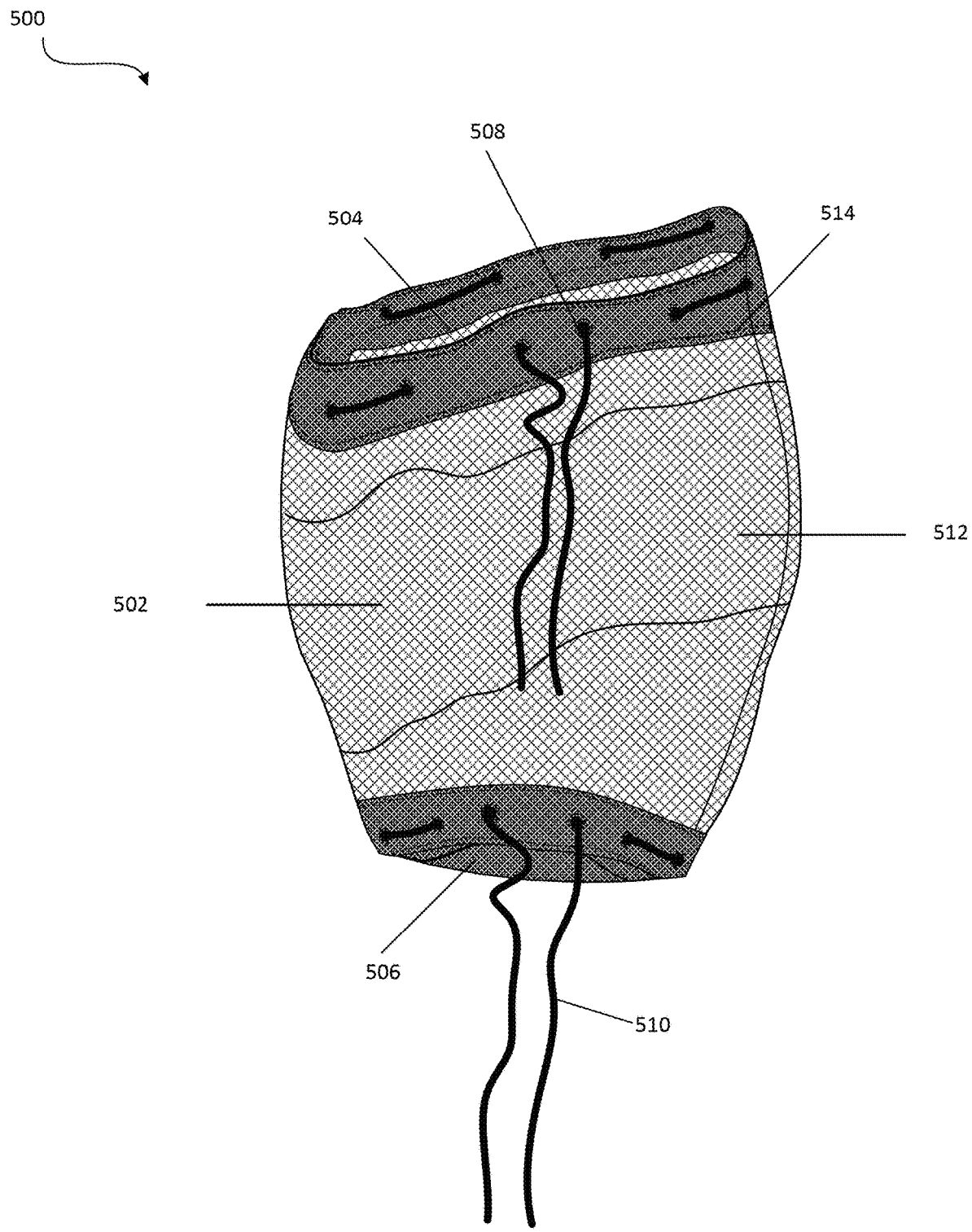
FIG. 5 is an illustration of a ventilated pet safety carrier, according to one or more embodiments.

FIG. 5 is an illustration 500 of a ventilated pet safety carrier, according to one or more embodiments. The ventilated pet safety carrier 502 can include a first opening 504 and a second opening 506. The first opening 504 and the second opening 506 can each be opened or closed, such as with a zipper, Velcro, clip, drawstring, button, or other appropriate feature. As illustrated, the ventilated pet safety carrier 502 can include a first drawstring 508 and a second drawstring 510. In other embodiments, the ventilated pet safety carrier 502 can include a zipper, Velcro, clip, button, or other appropriate feature. The first drawstring 508 can be used to open or close the first opening 504, and the second drawstring 510 can be used to open or close the second opening 506. The body 512 of the ventilated pet safety carrier 502 can be configured to have a size large enough to hold a pet, such as a cat or a dog. In the instance that the ventilated pet safety carrier 502 is mounted to a pet crate and in an expanded state, the volume that forms the living space for the pet can be inward from the body of the ventilated pet safety carrier 502.

The ventilated pet safety carrier 502 can be fabricated from various materials. For example, the ventilated pet safety carrier 502 can be fabricated from a mesh material (e.g., spun mesh or filament mesh) that includes a plurality of holes. The holes can be large enough to allow air to pass through to allow the pet to breathe. The ventilated pet safety carrier 502 can include a configurable number of holes that allows air to pass through the ventilated pet safety carrier, such that the pet can breathe.

In some embodiments, the ventilated pet safety carrier 502 includes a protective material 514 about the first drawstring 508 about the second drawstring 510. For illustration and brevity purposes the protective material 514 is described about the first drawstring 508. In some embodiments, the protective material is also arranged about the second drawstring 510. The protective material 514 can include an opening that permits the ends of the first drawstring 508 to extend through the opening. The protective material 514 can be a different material than a balance of the material of the ventilated pet safety carrier 502. The protective material 514 can further be attached to the ventilated pet safety carrier 502. For example, the protective material 514 can be affixed to an inner surface of the ventilated pet safety carrier 502, an outer surface of the ventilated pet safety carrier 502 or sown into the ventilated pet safety carrier 502. The protective material 514 can help protect a user that is attempting to open or close a ventilated pet safety carrier opening using the first drawstring 508. For example, the protective material 514 can be a piece of leather, synthetic leather, or other nonperforated material that the first drawstring 508 can extend through. The protective material 514 can have a width that is similar to a width of a user's hands (e.g., four inches, five inches). In the event a user is attempting to manipulate the first drawstring 508 to open or close an opening, the protective material 514 can guard against a pet scratching or biting at the user's hands. As illustrated, the second drawstring 510 has been pulled from the protective material to cause the second opening 506 to close more than the first opening 504. In a closed position, the protective material can bunch up and protect a user's hands near the second drawstring 510 from a pet inside the ventilated pet safety carrier 502.

Figure 6:
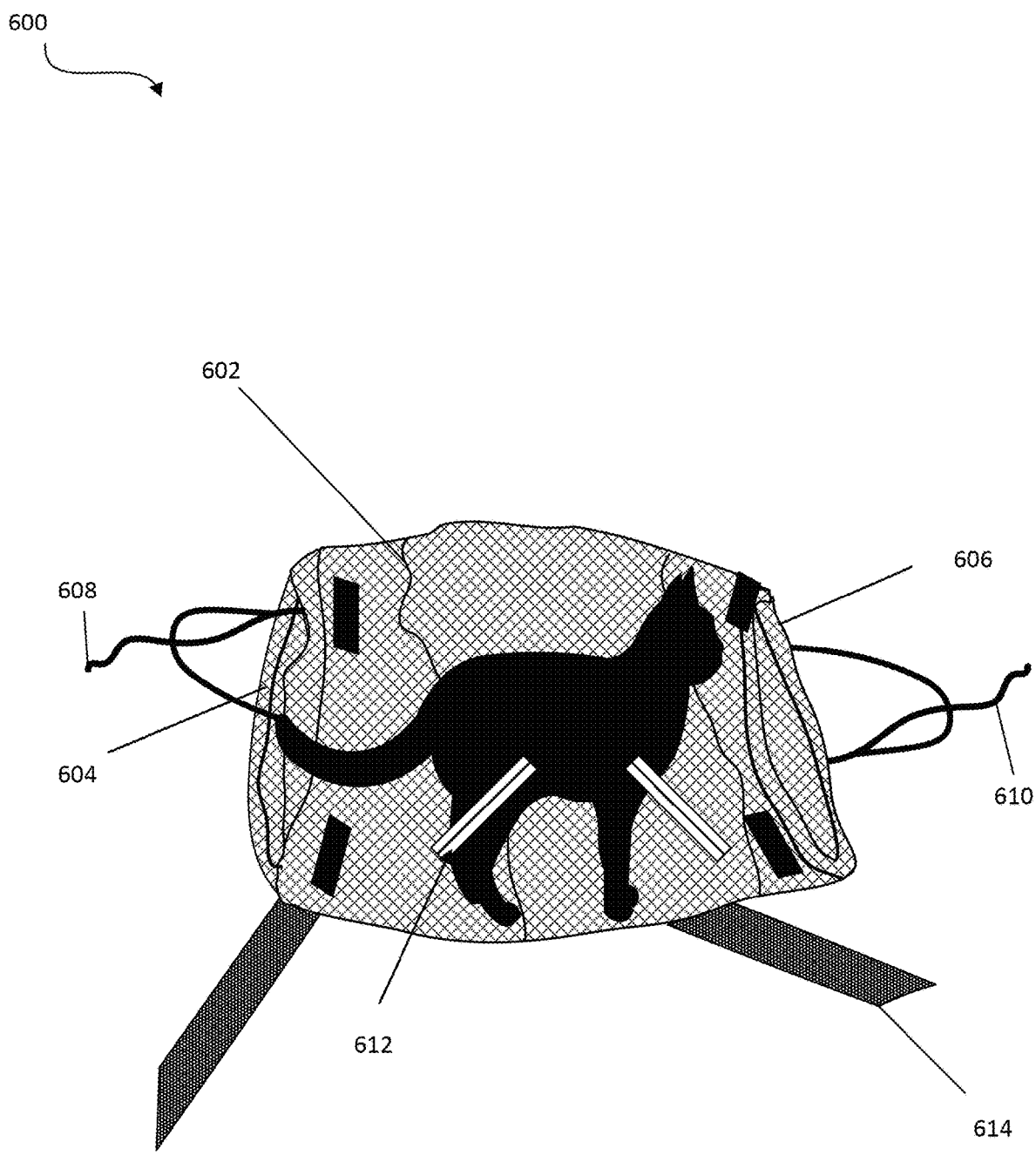
FIG. 6 is an illustration of a ventilated pet safety carrier, according to one or more embodiments.

FIG. 6 is an illustration 600 of a ventilated pet safety carrier, according to one or more embodiments. The ventilated pet safety carrier 602 can include a first opening 604 and a second opening 606. The first opening 604 and the second opening 606 can each be opened or closed with a first fastening feature, such as with a zipper, Velcro, drawstring, clip, button, or other appropriate feature. As illustrated, the ventilated pet safety carrier 602 can include a first drawstring 608 and a second drawstring 610. In addition, the ventilated pet safety carrier 602 can include one or more targeted openings 612. A targeted opening 612 can include a second fastening feature, for example, a zipper, Velcro, clip, drawstring, button, or other appropriate feature similar to the first opening 604 and the second opening 606. A targeted opening 612 can be arranged, such that the targeted opening 612 would be proximate to an area of interest on a pet. For example, the one targeted opening 612 can be spaced apart from another targeted opening 612 at a distance that would permit the user to pull out a pet leg or pet arm from one targeted opening 612 and another pet arm or pet leg from another targeted opening 612.

The ventilated pet safety carrier 602 can be in an expanded state or a collapsed state. The expanded state can include a stretched state or an unstretched state. In the expanded state, the ventilated pet safety carrier 602 can be configured to have a volume that creates a living space for the pet. The dimensions of the ventilated pet safety carrier 602 can be configured to create a volume that provides the pet ample room for resting in a pet crate. As illustrated, the ventilated pet safety carrier 602 is in an expanded state and a pet is in the living space. For example, in some instances, a ventilated pet safety carrier 602 can be configured for a smaller animal, such as a cat. In other instances, the ventilated pet safety carrier 602 can be configured for a smaller animal, such as a dog. In other instance, the dimensions of the ventilated pet safety carrier 602 can be configured for the dimensions of a pet crate. For example, the dimensions of the ventilated pet safety carrier 602 can be configured for the mounts attached to the inner surface of the pet crate. While in the expanded state, the pet can move about the volume created by the ventilated pet safety carrier 602. The pet can stand upright, lie down, face one direction or turn and face another direction. The ventilated pet safety carrier 602 can further be perforated, allowing the pet to breathe freely while in the ventilated pet safety carrier 602.

In addition, the ventilated pet safety carrier 502 can further include one or more safety restraint 614. The safety restraint 614 can, be for example, a strap or a band. The safety restraint 614 can be configured to have a length, such that the safety restraint 614 can be wrapped around the ventilated pet safety carrier 602 and the pet. The safety restraint can further include a fastener, such as a zipper, Velcro, clip, or a button to hold the safety restraint in place. For example, the veterinarian's assistant or the veterinarian can wrap the safety restraint 614 around the ventilated pet safety carrier 602 where the pats hind legs are to prevent the pet from kicking the veterinarian's assistant or the veterinarian. One end of the safety restraint 614 can include a first fastener (e.g., first Velcro) and the second end of the safety restraint can include a second fastener (e.g., second Velcro). The veterinarian's assistant or the veterinarian can wrap the safety restraint 614 over the ventilated pet safety carrier 602 and around the hind legs. For example, if a pet is being uncooperative, the safety restraint can be applied to prevent the pet from self-harm or from harming the veterinarian's staff. The veterinarian's assistant or the veterinarian can fasten the first fastener to the second fastener to hold the safety restraint in place. Once the veterinarian's assistant or the veterinarian has completed, the veterinarian's assistant or the veterinarian can loosen the safety restraint 614. The ventilated pet safety carrier 602 can further include mounting feature 616. The mounting feature 616 can correspond to a mount on a pet crate. For example, if the pet crate includes a mount in the form of a hook, the mounting feature can be a band that can attach to the hook. Or, for example, if the pet crate includes a mount in the form of Velcro, the ventilated pet safety carrier 602 can include a corresponding mounting feature 616 in the form of a Velcro strap to removably attach to the Velcro mount of the pet crate.

Figure 7:
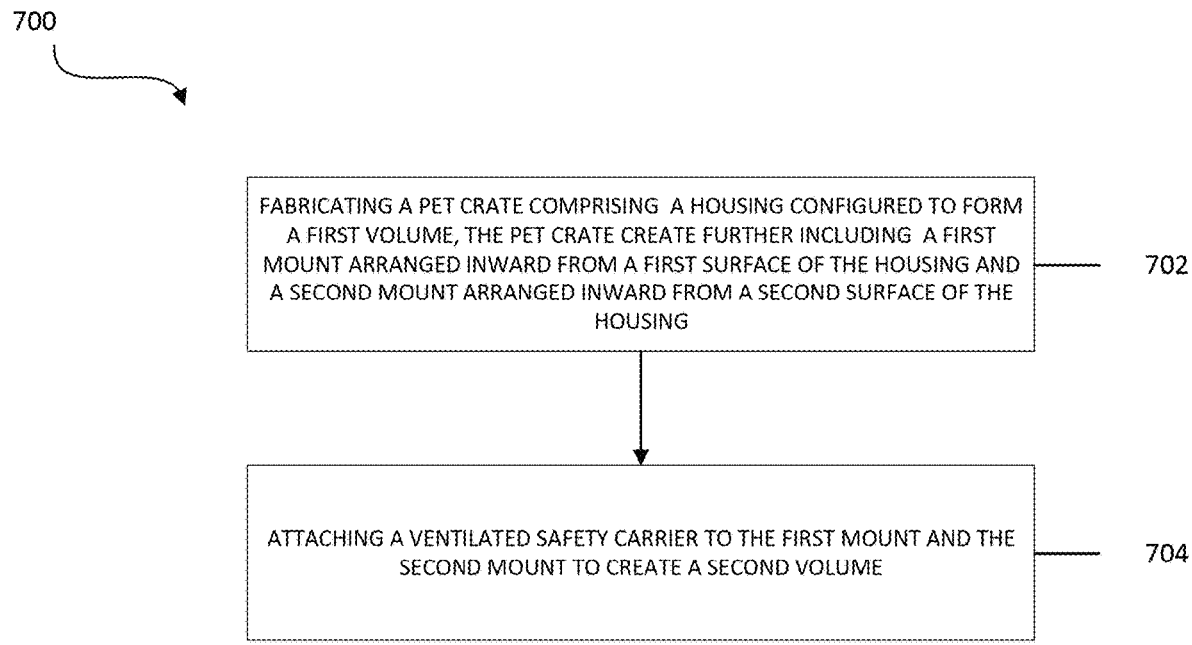
FIG. 7 is a process flow for fabricating a portable pet crate with a ventilated pet safety carrier, according to one or more embodiments.

FIG. 7 is a process flow 700 for fabricating a portable pet crate with a ventilated pet safety carrier, according to one or more embodiments. At 702, the method can include obtaining a pet crate, the pet crate including a surface configured to form a volume, the pet crate further including the first mount arranged inward from a surface of the pet crate and a second mount arranged inward from a surface of the pet crate. The pet crate can further include a first wall that includes a pet crate opening and a second wall that includes a transparent portion. The first wall can be arranged opposite to the second wall. In other embodiments, the pet crate can include one or more guided flaps connected to the first all and proximate to the pet crate opening. It should be appreciated that obtaining can include receiving, purchasing, or otherwise becoming in possession of the pet crate.

The pet crate can include a housing formed from multiple walls, in which each wall can be considered a surface. The walls can be arranged to form a first volume inward from each wall. The first volume can form a living space for a pet. In some instances, the housing includes a first housing and a second housing that can be connected to the first housing. For example, the first housing can include a wing connected to a wing of the second housing by one or more carrier fasteners, such as a bolt. In other embodiments, the housing can include single housing, such that rather than have a first housing connected to a second housing, the housing can be fabricated as a single structure. The pet crate can further include a handle connected to the housing for permitting a user to carry the pet crate.

At 704, the method can include attaching a ventilated pet safety carrier to the first mount and the second mount to create a second volume. The ventilated pet safety carrier can include a first opening and a second opening. The first opening and the second opening can each be opened or closed using a first fastening feature, such as with a zipper, Velcro, drawstring, clip, button, or other appropriate feature. In addition, the ventilated pet safety carrier can include one or more targeted openings arranged about the ventilated pet safety carrier. A targeted opening can include an orifice and a second fastening feature, for example, a zipper, Velcro, clip, drawstring, button, or other appropriate feature. A targeted opening can be arranged, such that the targeted opening would be proximate to an area of interest on a pet.

The pet crate can further include a first mount and a second mount. The first mount and the second mount can each be arranged inward from a surface of the pet crate. The first mount and the second mount can assume various forms, such as a hook, Velcro, clip, button, strap, or other mount operable to mount the ventilated pet safety carrier to a surface of the pet crate. The first mount and a second mount can be used to removably connect the ventilated pet safety carrier to the pet crate. The first mount and the second mount can be configured such that, when mounted, the ventilated pet safety carrier creates a large volume to allow the pet to move freely about.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A pet crate safety system, comprising:
   a plurality of walls forming a housing of a pet crate, the plurality of walls arranged to form a first volume, the housing comprising a first housing and a second housing, wherein the first housing is configured to be removably connected to the second housing, and wherein the first housing comprises a wall of the plurality of walls;
   a first wall of the plurality of walls comprising a pet crate opening;
   a second wall of the plurality of walls comprising a transparent portion, the second wall arranged at an opposite end of the pet crate as the first wall, the transparent portion extending from the first housing to the second housing;
   a hook arranged on a first surface of a wall of the plurality of walls, the hook having a first end extending from the first surface of the wall; and
   a ventilated pet safety carrier configured to be removably mounted to a second end of the hook and arranged in the first volume, the ventilated pet safety carrier further configured to form a second volume when attached to the hook such that a pet can be contained in the second volume and not in a remaining portion of the pet crate.

2. The pet crate safety system of claim 1, wherein the transparent portion comprises glass or a transparent polymer, and wherein the second wall forms a frame securing the transparent portion.

3. The pet crate safety system of claim 1, wherein the ventilated pet safety carrier comprises:
   an opening; and
   a perforated material configured to be in a collapsed state or an expanded state, wherein the ventilated pet safety carrier forms the second volume while in the expanded state.

4. The pet crate safety system of claim 3, wherein the ventilated pet safety carrier further comprises a fastening feature configured to expand or contract the opening.

5. The pet crate safety system of claim 3, wherein the opening is a first opening, wherein the ventilated pet safety carrier further comprises a second opening and a third opening, wherein the first opening and the second opening being configured for ingress and egress to and from the ventilated pet safety carrier by a pet, wherein the third opening comprising a fastening feature, and wherein the third opening is configured to expose a portion of the pet.

6. The pet crate safety system of claim 1, wherein the ventilated pet safety carrier comprises a safety restraint configured to wrap around the ventilated pet safety carrier.

7. The pet crate safety system of claim 1, wherein the housing comprises a single housing, and wherein the hook is connected to an inner surface of the single housing.

* * * * *